United States Patent
Rengan (10) Patent No.: US 9,923,896 B2
(45) Date of Patent: Mar. 20, 2018

(54) PROVIDING ACCESS TO A RESTRICTED RESOURCE VIA A PERSISTENT AUTHENTICATED DEVICE NETWORK

(71) Applicant: LENOVO ENTERPRISE SOLUTIONS (SINGAPORE) PTE. LTD., Singapore (SG)

(72) Inventor: Marco M. Rengan, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 114 days.

(21) Appl. No.: 14/552,090

(22) Filed: Nov. 24, 2014

(65) Prior Publication Data

US 2016/0149881 A1 May 26, 2016

(51) Int. Cl.
H04L 29/06 (2006.01)

(52) U.S. Cl.
CPC ........ *H04L 63/0884* (2013.01); *H04L 63/107* (2013.01); *H04L 63/10* (2013.01); *H04L 63/108* (2013.01)

(58) Field of Classification Search
CPC ..... H04L 63/0884; H04L 63/10; H04L 9/085; G06F 21/41
See application file for complete search history.

(56) References Cited

U.S. PATENT DOCUMENTS

| | | | |
|---|---|---|---|
| 6,088,450 A * | 7/2000 | Davis | G06F 21/35 235/380 |
| 6,247,026 B1 * | 6/2001 | Waldo | G06F 9/4411 |
| 7,802,297 B2 | 9/2010 | Bennett et al. | |
| 7,953,670 B2 | 5/2011 | Colella | |
| 8,369,833 B2 | 2/2013 | McClain | |
| 8,553,885 B2 | 10/2013 | Little et al. | |
| 2003/0212894 A1 | 11/2003 | Buck et al. | |
| 2005/0081044 A1 * | 4/2005 | Giles | H04L 63/08 713/182 |
| 2005/0221798 A1 * | 10/2005 | Sengupta | H04M 1/67 455/411 |

(Continued)

OTHER PUBLICATIONS

BATTLENET.net, "Battlenet Authenticator", Battlenet.net (online publication), Support, Account Support, Security, May 2014, 2 pages, URL: https://us.battle.net/support/en/article/battlenet-authenticator.

(Continued)

*Primary Examiner* — Robert Leung
(74) *Attorney, Agent, or Firm* — Brandon C. Kennedy; Jason A. Friday; Kennedy Lenart Spraggins LLP (57) ABSTRACT

Providing access to a restricted resource via a persistent authenticated device network, including: authenticating a user; joining a persistent authenticated device network; iteratively, upon the expiration of a predetermined period of time, determining whether the user remains authenticated; responsive to determining that the user remains authenticated, determining whether a downstream computing device in the persistent authenticated device network is attempting to access a restricted resource; and responsive to determining that the downstream computing device in the persistent authenticated device network is attempting to access a restricted resource, providing user authentication information to the downstream computing device.

17 Claims, 6 Drawing Sheets

(56) References Cited

U.S. PATENT DOCUMENTS

| | | | |
|---|---|---|---|
| 2009/0006846 A1 | 1/2009 | Rosenblatt | |
| 2009/0177892 A1 | 7/2009 | Steeves et al. | |
| 2013/0191902 A1* | 7/2013 | Friedl | H04L 9/3271 726/7 |
| 2014/0020051 A1* | 1/2014 | Lu | G06F 21/6218 726/1 |
| 2014/0026200 A1* | 1/2014 | Ekberg | H04L 9/3236 726/6 |
| 2014/0289824 A1* | 9/2014 | Chan | G06F 9/54 726/5 |
| 2014/0380443 A1* | 12/2014 | Stark | H04W 12/08 726/7 |
| 2015/0046990 A1* | 2/2015 | Oberheide | G06F 21/32 726/6 |
| 2016/0127351 A1* | 5/2016 | Smith | G06F 21/316 726/10 |

OTHER PUBLICATIONS

Wikipedia, "Multi-factor authentication", Wikipedia.org (online publication), retrieved Jun. 2014, 17 pages, URL: http://en.wikipedia.org/wiki/Multi-factor_authentication.

Wikipedia, "Trusted Computing", Wikipedia.org (online publication), retrieved Jun. 2014, 12 pages, URL: http://en.wikipedia.org/wiki/Trusted_Computing.

Wikipedia, "Trusted Platform Module", Wikipedia.org (online publication), retrieved Jun. 2014, 6 pages, URL: http://en.wikipedia.org/wiki/Trusted_Platform_Module.

MANAGEENGINE.com, "Password Management Software—Two Factor Authentication", ManageEngine.com (online publication), Password Manager, Features, retrieved Jun. 2014, 2 pages, URL: http://www.manageengine.com/products/passwordmanagerpro/two-factor-authentication.html.

Wikipedia, "Chain of trust", Wikipedia.org (online publication), retrieved Jun. 2014, 1 page, URL: http://en.wikipedia.org/wiki/Chain_of_trust.

Henry, "How to Build a (Nearly) Hack-Proof Password System with LastPass and a Thumb Drive", LifeHacker.com (online publication), Jan. 2012, 30 pages, URL: http://lifehacker.com/5879117/how-to-build-a-nearly-hack-proof-password-system-with-lastpass-and-a-thumb-drive.

Wikipedia, "Single sign-on", Wikipedia.org (online publication), retrieved Jun. 2014, 4 pages, URL: http://en.wikipedia.org/wiki/Single_sign-on.

D'Onfro, "A New Wristband, Nymi, Unlocks Belongings With Your Heartbeat So You Won't Have to Lift a Finger", BusinessInsider.com (online publication), Sep. 2013, 2 pages, URL: http://www.businessinsider.com/nymi-wristband-tracks-heartbeat-for-authentication-2013-9.

Lee, "AutoLock", Lenovo ThinkCentre M9 2z All-In-One Desktop PC, SilentPCReview.com (online publication), Oct. 2012, p. 7, URL: http://www.silentpcreview.com/article1310-page7.html.

Lenovo, "Lenovo AutoLock", ThinkPad User Guide: ThinkPad Edge E430, E430c, E435, E530, E530c, and E535, Chapter 1, Product overview, Lenovo.com (online publication), First Edition, May 2012, p. 17, URL: http://www.lenovo.com/shop/americas/content/user_guides/e430_e530_ug_en.pdf.

DigitalPersona, "DigitalPersona Delivers Multi-Factor Authentication for Users on the Go with Support for Contactless Proximity Cards and Bluetooth Phones", Press Release, digitalPersona.com (online publication), Feb. 2012, 2 pages, URL: http://www.digitalpersona.com/Content.aspx?id=3284#sthash.7Klkcft6.dpufhttp://www.bizjournals.com/prnewswire/press_releases/2012/02/01/SF45435.

\* cited by examiner

PROVIDING ACCESS TO A RESTRICTED RESOURCE VIA A PERSISTENT AUTHENTICATED DEVICE NETWORK

BACKGROUND OF THE INVENTION

Field of the Invention

The field of the invention is data processing, or, more specifically, methods, apparatus, and products for providing access to a restricted resource via a persistent authenticated device network.

Description of Related Art

Modern computing devices and the resources contained therein are frequently intended only to be used by certain users. As such, the identity of a user may be authenticated prior to granting access to such resources, frequently by the user providing a username and password. The number of passwords utilized by a user may increase and become unmanageable, as users are frequently unable to easily remember all the passwords used in different environments, even though it is the owner of the passwords who is rightfully entitled to access such resources. The burden on the end user is ever increasing and this approach being used continues to rely on an architecture that is antiquated and inefficient.

SUMMARY OF THE INVENTION

Methods, apparatuses, and products for providing access to a restricted resource via a persistent authenticated device network, including: authenticating a user; joining a persistent authenticated device network; iteratively, upon the expiration of a predetermined period of time, determining whether the user remains authenticated; responsive to determining that the user remains authenticated, determining whether a downstream computing device in the persistent authenticated device network is attempting to access a restricted resource; and responsive to determining that the downstream computing device in the persistent authenticated device network is attempting to access a restricted resource, providing user authentication information to the downstream computing device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
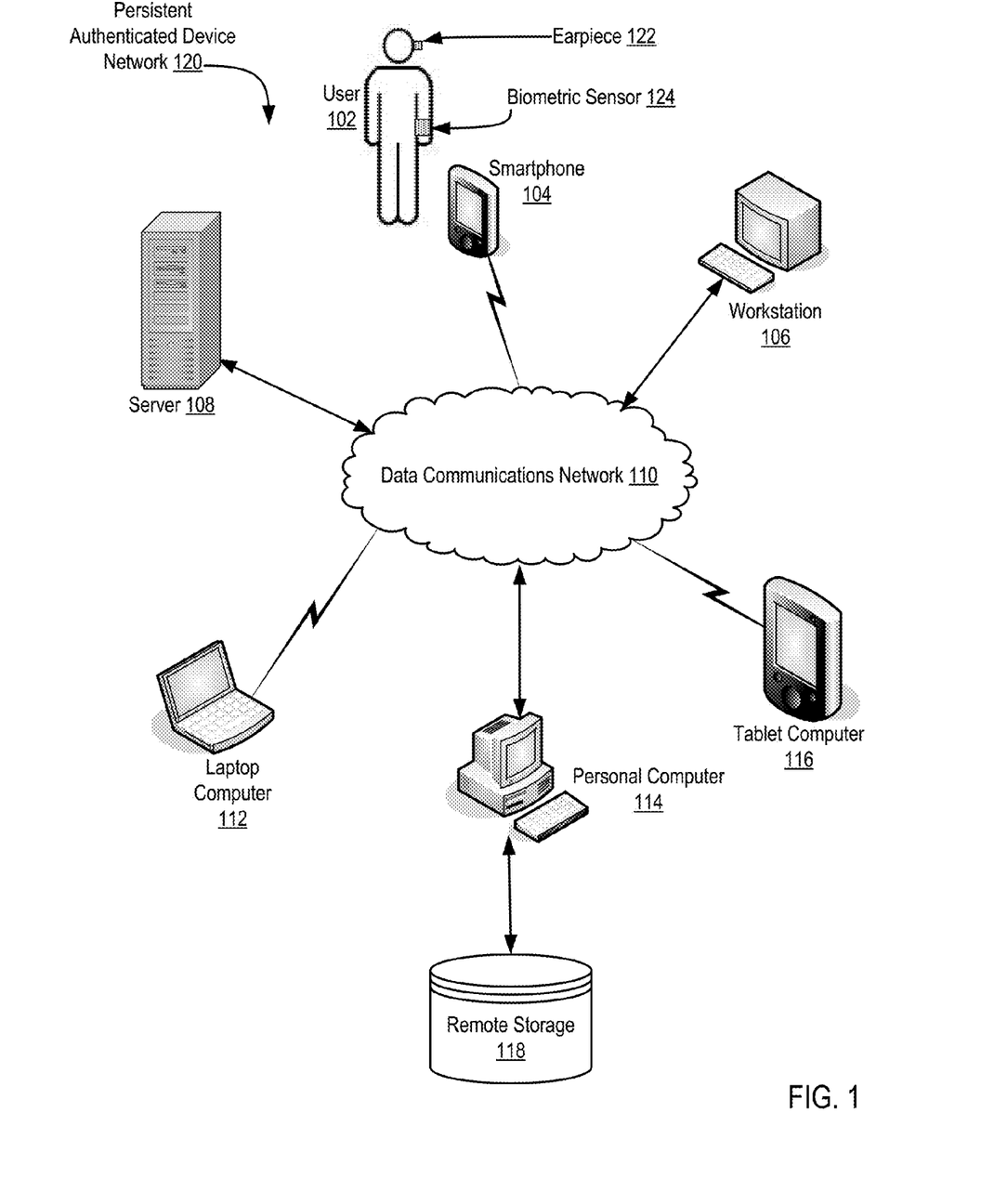
FIG. 1 sets forth a network diagram of a system for providing access to a restricted resource via a persistent authenticated device network according to embodiments of the present invention.

Example methods, apparatuses, and products for providing access to a restricted resource via a persistent authenticated device network in accordance with the present invention are described with reference to the accompanying drawings, beginning with FIG. 1. FIG. 1 sets forth a network diagram of a system for providing access to a restricted resource via a persistent authenticated device network (120) according to embodiments of the present invention.

The system of FIG. 1 includes a plurality of devices that collectively form a persistent authenticated device network (120). A persistent authenticated device network (120) represents a collection of devices that can communicate with each other, directly or indirectly, for the purposes of sharing user authentication information used to access a restricted resource. Such a restricted resource may be embodied, for example, as a computing device to which access is restricted, a particular file to which access is restricted, a webpage to which access is restricted, and so on. In such an example, the restricted resource may be accessed only by authenticated users, whose identities are confirmed through the use of user authentication information such as a username and password, biometric data, or the like.

The system depicted in FIG. 1 includes a smartphone (104), a workstation (106), a server (108), a laptop computer (112), a personal computer (114), a tablet computer (116), a wireless earpiece (122), and a remote storage (118) device. In the example depicted in FIG. 1, many of the devices are connected to a data communications network (110) such that each device can communicate with each other via the data communications network (110). Readers will appreciate, however, that many of the devices may also be configured to communicate with each other without the use of a data communications network (110). For example, many of the devices may be configured to communicate using near-field communications technologies, Bluetooth technologies, cabling running between two or more of the devices, and so on.

The example depicted in FIG. 1 includes a user (102) of the smartphone (104). The user (102) of the smartphone (104) may provide user authentication information to the smartphone (104), for example, by typing a username and password on a keypad provided by the smartphone (104), by pressing a finger on a fingerprint scanner that is included in or otherwise attached to the smartphone (104), by performing a retinal scan using a scanner that that is included in or otherwise attached to the smartphone (104), by a biometric sensor (124) detecting biometric data from the user (102), and so on. In such a way, the user (102) provides information to the smartphone (104) that may be used to access restricted resource. As will be described in greater detail below, when the user (102) of the smartphone (104) attempts to access a restricted resource via any of the other devices in the persistent authenticated device network (120), the smartphone (104) may transmit the information that is used to access restricted resources to other devices in the persistent authenticated device network (120), such that the user (102) may access the restricted resources using the other devices in the persistent authenticated device network (120), without needing to provide such user authentication information (e.g., password, retinal scan, etc. . . . ) to the other devices in the persistent authenticated device network (120). In such a way, the smartphone (104) may act as a surrogate of the user as the smartphone (104), rather than the user (102), will be providing authentication information to the other devices in the persistent authenticated device network (120). Readers will appreciate that while the smartphone (104) of FIG. 1 serves as a surrogate device, any of the other devices depicted in FIG. 1 may also serve as a surrogate device. For example, if the user (104) has also entered a username and password into the tablet computer (116), the tablet computer (116) may provide such a username and password to another device in the persistent authenticated device network (120), so long as the user (102) has remained continuously authenticated since entering the username and password, as described in greater detail below.

The arrangement of servers and other devices making up the example system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Providing access to a restricted resource via a persistent authenticated device network in accordance with the present invention is generally implemented with computers, that is, with automated computing machinery. In the system of FIG. 1, for example, the smartphone (104), workstation (106), server (108), laptop computer (112), personal computer (114), tablet computer (116), and remote storage (118) device are implemented to some extent at least as computers. For further explanation, therefore, FIG. 2 sets forth a block diagram of automated computing machinery comprising an example computer (152) useful in providing access to a restricted resource via a persistent authenticated device network according to embodiments of the present invention. The computer (152) of FIG. 2 includes at least one computer processor (156) or 'CPU' as well as random access memory (168) (RAM') which is connected through a high speed memory bus (166) and bus adapter (158) to processor (156) and to other components of the computer (152).

Figure 2:
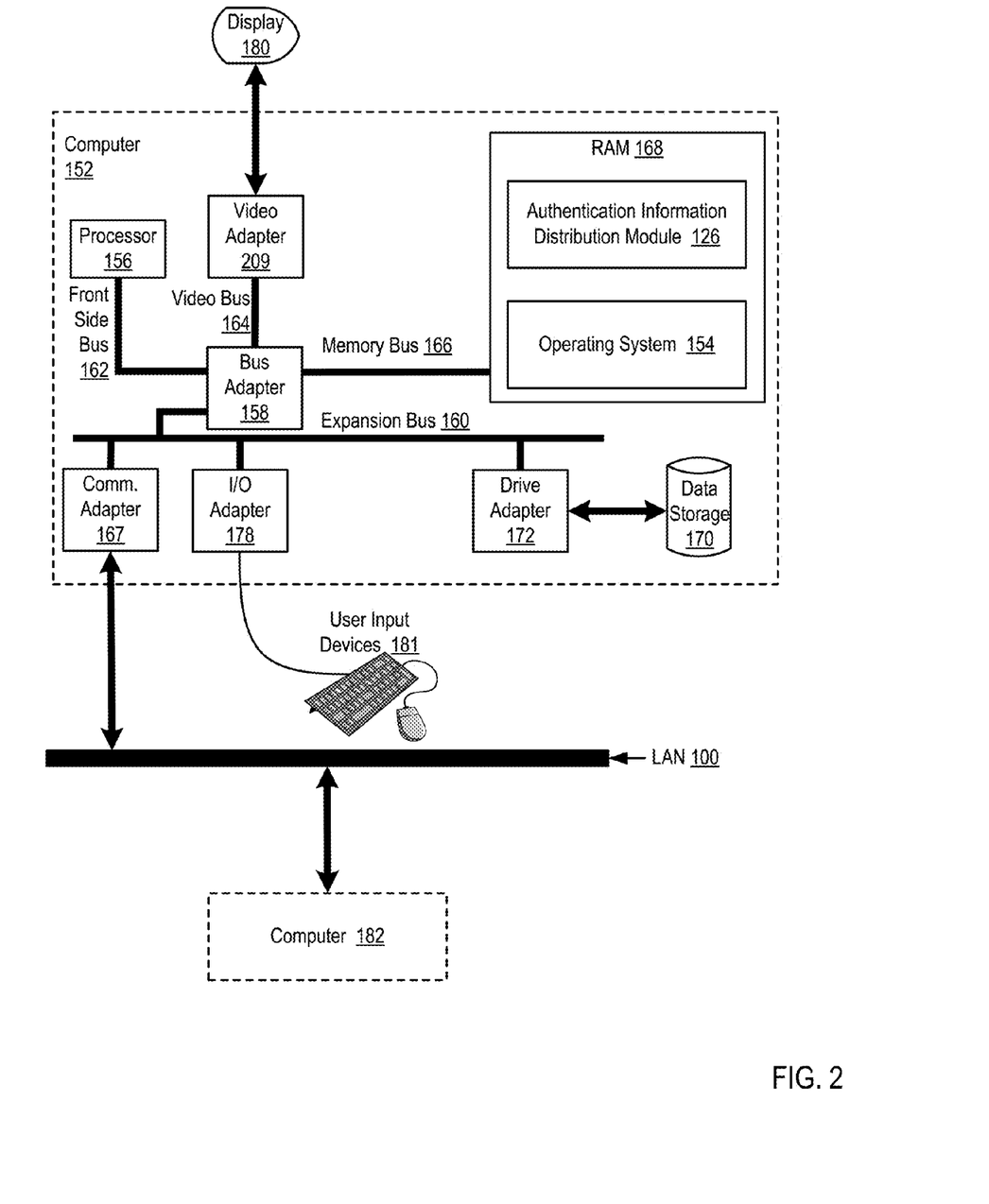
FIG. 2 sets forth a block diagram of automated computing machinery comprising an example computer useful in providing access to a restricted resource via a persistent authenticated device network according to embodiments of the present invention.

Stored in RAM (168) is an authentication information distribution module (126), a module of computer program instructions for providing access to a restricted resource via a persistent authenticated device network according to embodiments of the present invention. The authentication information distribution module (126) may be configured to provide access to a restricted resource via a persistent authenticated device network by authenticating a user; joining a persistent authenticated device network; iteratively, upon the expiration of a predetermined period of time, determining whether the user remains authenticated; responsive to determining that the user remains authenticated, determining whether a downstream computing device in the persistent authenticated device network is attempting to access a restricted resource; and responsive to determining that the downstream computing device in the persistent authenticated device network is attempting to access a restricted resource, providing user authentication information to the downstream computing device.

Also stored in RAM (168) is an operating system (154). Operating systems useful providing access to a restricted resource via a persistent authenticated device network according to embodiments of the present invention include UNIX™, Linux™, Microsoft XP™, AIX™, IBM's i5/OS™, and others as will occur to those of skill in the art. The operating system (154) and the authentication information distribution module (126) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for providing access to a restricted resource via a persistent authenticated device network according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for providing access to a restricted resource via a persistent authenticated device network according to embodiments of the present invention include modems for wired dial-up communications, Ethernet (IEEE 802.3) adapters for wired data communications network communications, and 802.11 adapters for wireless data communications network communications.

Figure 3:
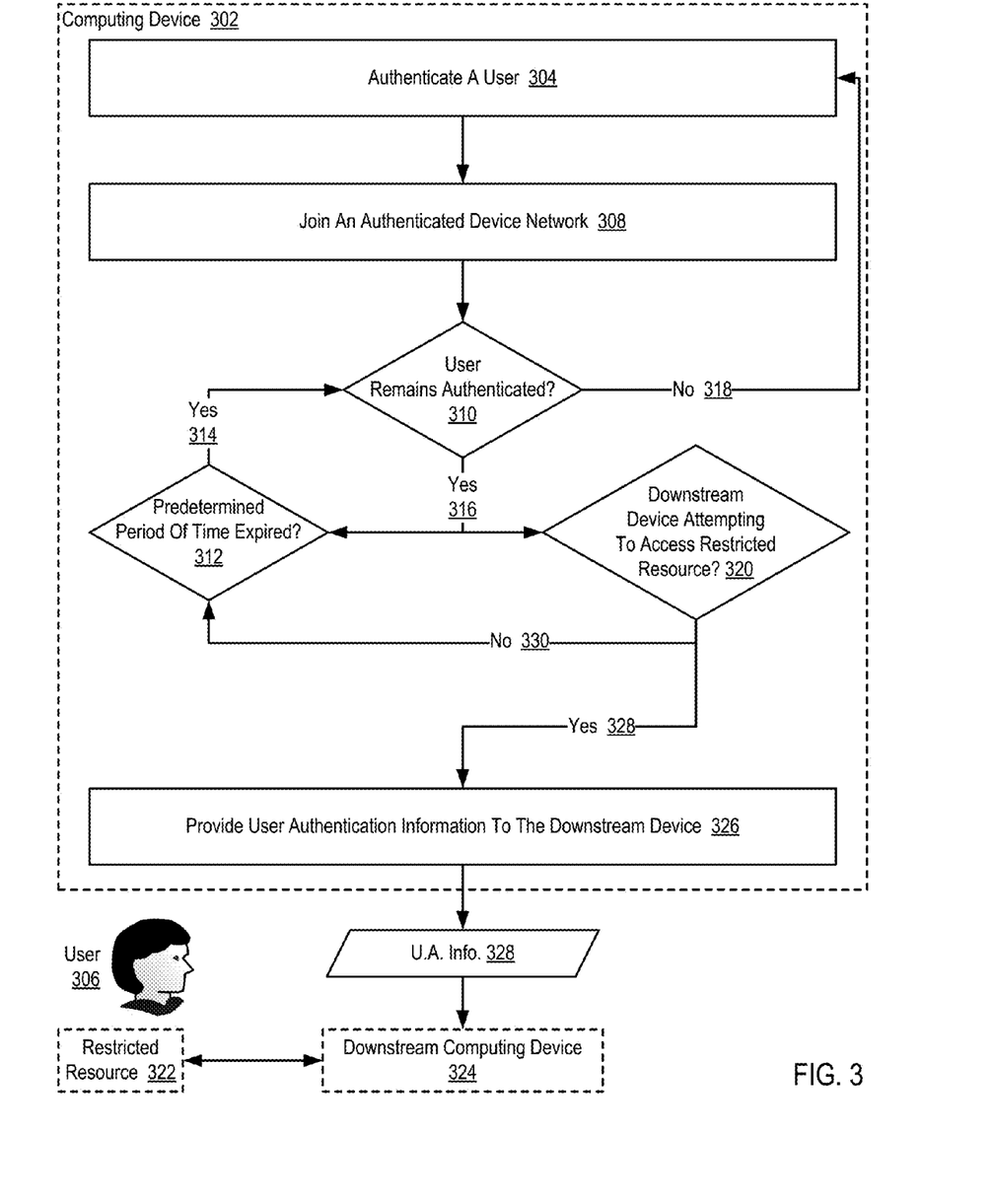
FIG. 3 sets forth a flow chart illustrating an example method for providing access to a restricted resource via a persistent authenticated device network according to embodiments of the present invention.

For further explanation, FIG. 3 sets forth a flow chart illustrating an example method for providing access to a restricted resource via a persistent authenticated device network according to embodiments of the present invention. A persistent authenticated device network represents a collection of devices that can communicate with each other, directly or indirectly, for the purposes of sharing user authentication information used to access a restricted resource. Such a restricted resource may be embodied, for example, as a computing device to which access is restricted, a particular file to which access is restricted, a webpage to which access is restricted, and so on. In such an example, the restricted resource may be accessed only by authenticated users, whose identities are confirmed through the use of user authentication information such as a username and password, biometric data, or the like.

The example method depicted in FIG. 3 is carried out by computer program instructions executing on a first computing device such as the computing device (302) depicted in FIG. 3. Although not illustrated in FIG. 3, the computing device (302) may include a computer memory for storing the computer program instructions and a computer processor for executing the computer program instructions. The computing device (302) may be embodied, for example, as a smartphone, as a tablet computer, as a wearable computing device such as a smartwatch, and in many other form factors. Such a computing device (302) may include input devices that are used to receive information that is used to identify a user (304) of the computing device (302) such as, for example, a keypad for receiving a username and password, a fingerprint scanner for detecting a fingerprint of the user (304), a retina scanner for scanning the retina of the user (304), and so on. The computing device (302) may also include computer hardware for communicating with another computing device or a data communications network. Such data communications hardware can include, for example, wireless adapters configured for wireless packetized communications with a data communications network, mobile communications adapters for communicating with a mobile communications network (e.g., an LTE network, a 4G network), an RFID transponder for near-field communications, a Bluetooth adapter for exchanging data over short distances, and so on.

The example method depicted in FIG. 3 includes authenticating (304) a user (306) of the computing device (302). Authenticating (304) a user (306) of the computing device (302) may be carried out, for example, by receiving input from the user (306) such as a username and password, by receiving biometric data from the user (306) such as the user's fingerprint or a retinal scan of the user, or by receiving some other form of information used to validate the identity of the user (306). Such information may subsequently be compared to previously gathered information to authenticate the identity of the user (306). For example, the username and password received from the user (306) may be compared to a previously captured username and password, the received biometric data may be compared to previously captured biometric data, and so on. In such an example, if the information received from the user matches the previously gathered information within a predetermined tolerance, the user (306) may be authenticated (304).

The example method depicted in FIG. 3 also includes joining (308) a persistent authenticated device network. In the example method depicted in FIG. 3, a persistent authenticated device network represents a collection of computing devices that can share user authentication information with each other. The computing device (302) of FIG. 3 may join (308) a persistent authenticated device network by joining an existing persistent authenticated device network or creating a persistent authenticated device network where the computing device (302) is the first member of such a network.

The example method depicted in FIG. 3 also includes determining (310) whether the user (306) remains authenticated. The user (306) of the computing device (302) may remain authenticated, for example, by simply remaining within a first distance of the computing device (302). As such, determining (310) whether the user (306) remains authenticated may be carried out, for example, through the use of one or more sensors used to confirm the presence of the user. Such sensors may be embodied, for example, a biometric sensor configured to check for the presence of a user's pulse such that the absence of a pulse indicates that the user (306) is no longer within a first distance of the computing device (302). Alternatively, such sensors may be embodied as a heat sensor configured to check for the presence of a user's body heat, such that the detected temperature falling below a predetermined threshold indicates that the user (306) is no longer within a first distance of the computing device (302). Readers will appreciate that the proximity of the user (306) to the computing device (302) may be determined in a variety of ways utilizing a variety of technologies.

In addition to determining (310) whether the user (306) remains authenticated by determining whether the user (306) is within a first distance of the computing device (302), in alternative embodiments determining (310) whether the user (306) remains authenticated may be carried out by periodically prompting the user to provide information used to verify the identity of the user. Such information can include a password, biometric data, and so on. Similarly, continuous use of the computing device (302) may be used to determine (310) whether the user (306) remains authenticated, as continuous use of the device may be evidence that the user that initially provided the authentication information is still using the computing device (302).

In the example method depicted in FIG. 3, determining (310) whether the user (306) remains authenticated is carried out iteratively upon the expiration of a predetermined period of time. The predetermined period of time may be sufficiently small (e.g., 0.1 second) such that, in effect, the computing device (302) is constantly determining (310) whether the user (306) remains authenticated. In fact, the computing device (302) may be configured such that the computer program instructions that carry out the process of determining (310) whether the user (306) remains authenticated may be in an infinite loop, such that each time that the computing device (302) has affirmatively (316) determined that the user (306) remains authenticated, the computing device (302) immediately begins re-execution of the process of determining (310) whether the user (306) remains authenticated. Likewise, sensors (e.g., a biometric sensor configured to detect a user's pulse) that are used to determine (310) whether the user (306) remains authenticated may be continuously powered up and continuously monitoring the user's presence.

In the example method depicted in FIG. 3, if the computing device (302) determines that the user (306) is not (318) authenticated, the computing device (302) may remove itself from the persistent authenticated device network and re-initiate the process of authenticating (304) the user (306) of the computing device (302). If the computing device (302) affirmatively (316) determines that the user (306) remains authenticated, however, the computing device (302) may determine (312) whether the predetermined period of time has expired and, if it is affirmatively (314) determined that the predetermined period of time has expired, the computing device (302) may re-initiate the process of determining (310) whether the user (306) remains authenticated. In further response to affirmatively (316) determining that the user (306) remains authenticated, the computing device (302) may also determine (320) whether a downstream computing device (324) in the persistent authenticated device network is attempting to access a restricted resource (322). Readers will appreciate that the computing device (302) may determine (312) whether the predetermined period of time has expired and also determine (320) whether a downstream computing device (324) in the persistent authenticated device network is attempting to access a restricted resource (322), for example, through the use of multiple threads executing on the computing device (302) to carry out each function.

The restricted resource (322) of FIG. 3 may be embodied, for example, as a computing device to which access is restricted, a particular file to which access is restricted, a webpage to which access is restricted, and so on. In such an example, the restricted resource (322) may be accessed only by authenticated users, whose identities are confirmed through the use of user authentication information such as a username and password, biometric data, or the like.

The downstream computing device (324) of FIG. 3 represents a device that is part of the persistent authenticated device network. The downstream computing device (324) in the persistent authenticated device network may be embodied as, for example, a desktop computer, a laptop computer, a tablet computer, and so on. Such a device is 'downstream' in the sense that user authentication information is provided to the computing device (302) and passed down from the computing device (302) to the downstream computing device (324) such that the user (302) may access a restricted resource (322) via the downstream computing device (324) without the need to enter or provide the authentication information that has already been provided to the computing device (302).

In the example method depicted in FIG. 3, determining (320) whether a downstream computing device (324) in the persistent authenticated device network is attempting access a restricted resource (322) may be carried out, for example, by the computing device (302) receiving a message from the downstream computing device (324) that includes an identifier for the restricted resource (322) that the downstream computing device (324) is attempting to access, an identifier of the downstream computing device (324), and other information as may be necessary. The downstream computing device (324) may broadcast such a message, for example, using a near-field communications adapter or a bluetooth adapter such that only those devices that are within a first distance of the downstream computing device (324) may receive the message. In such a way, the computing device (302) may only receive messages that identify restricted resources (322) other devices are attempting to access from other devices that are within a first distance of the computing device (302).

The example method depicted in FIG. 3 also includes providing (326) user authentication information (328) to the downstream computing device (324). The computing device (302) may provide (326) the user authentication information (328) to the downstream computing device (324), for example, by sending a message to the downstream computing device (324) that includes the user authentication information (328), an identifier for the restricted resource (322), and other information as may be necessary. In the example method depicted in FIG. 3, the user authentication information (328) is only provided (326) to the downstream computing device (324) in response to affirmatively (328) determining (320) that the downstream computing device (324) in the persistent authenticated device network is attempting access a restricted resource (322).

Figure 4:
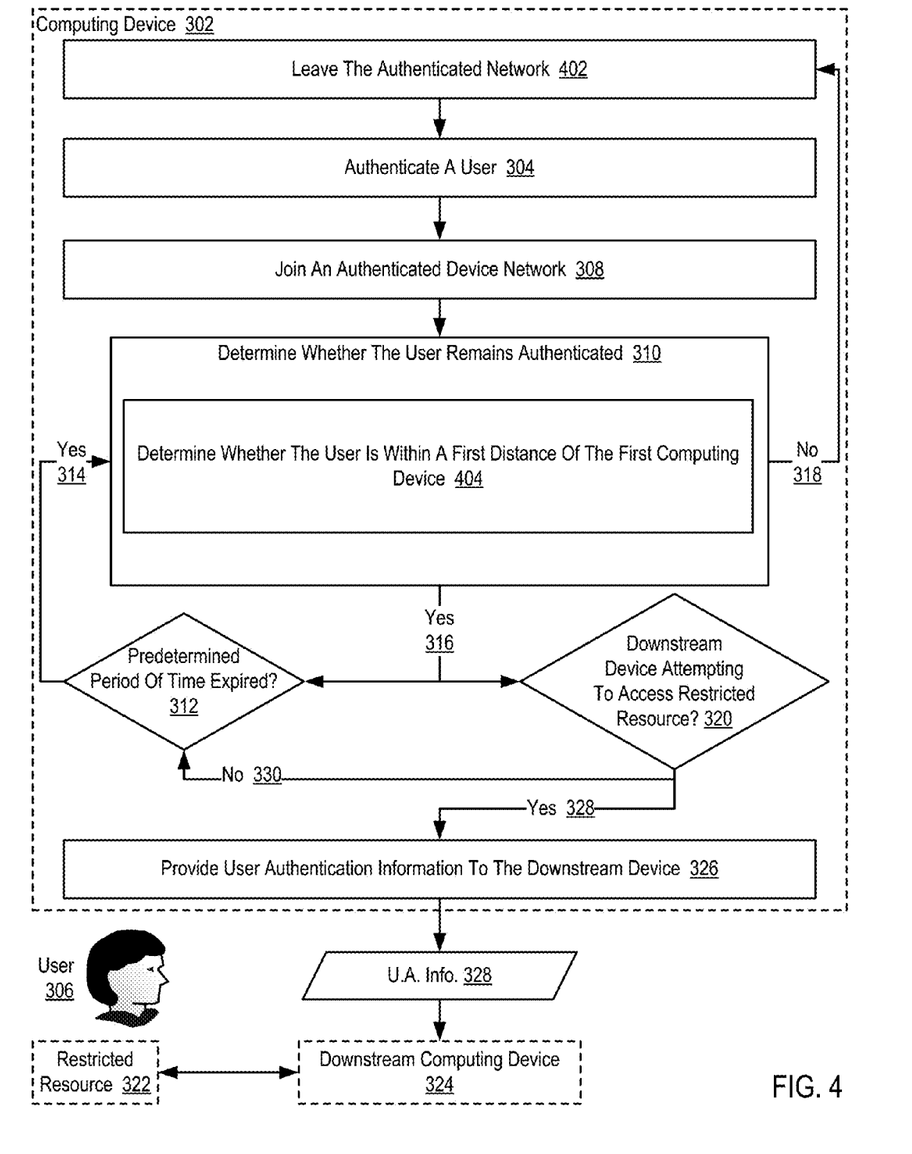
FIG. 4 sets forth a flow chart illustrating an additional example method for providing access to a restricted resource via a persistent authenticated device network according to embodiments of the present invention.

For further explanation, FIG. 4 sets forth a flow chart illustrating a further example method for providing access to a restricted resource via a persistent authenticated device network according to embodiments of the present invention. The example method depicted in FIG. 4 is similar to the example method depicted in FIG. 3, as the example method depicted in FIG. 4 also includes a computing device (302) carrying out the steps of authenticating (304) a user (306) of the computing device (302), joining (308) a persistent authenticated device network, determining (310) whether the user (306) remains authenticated, determining (320) whether a downstream computing device (324) in the persistent authenticated device network is attempting to access a restricted resource (322), and providing (326) user authentication information (328) to the downstream computing device (324).

The example method depicted in FIG. 4 also include, responsive to determining that the user (306) does not (318) remain authenticated, leaving (402) the persistent authenticated device network. In the example method depicted in FIG. 4, by leaving the persistent authenticated device network, the computing device (302) will no longer share user authentication information (328) with other devices in the persistent authenticated device network as the computing device (302) is no longer part of the persistent authenticated device network. In such a way, a policy is enforced that requires that the user (306) of the computing device (302) be persistently authenticated by the computing device (302) in order for the computing device (302) to share user authentication information (328) with other devices—as the computing device (302) will only share user authentication information (328) with other devices when the computing device (302) and the other devices are part of the same persistent authenticated device network.

In the example method depicted in FIG. 4, determining (310) whether the user (306) remains authenticated can include determining (404) whether the user (306) is within a first distance of the first computing device (302). In response to affirmatively determining that the user (306) is within a first distance of the first computing device (302), the user (306) remains authenticated and the user (306) therefore remains a member of the persistent authenticated device network. If the user (306) is not within a first distance of the first computing device (302), however, the user (306) ceases to remain authenticated and therefore leaves (402) the persistent authenticated device network.

In the example method depicted in FIG. 4, the first distance may be embodied, for example, as a physical distance measured in terms of inches, feet, meters, and so on. Alternatively, the first distance may be embodied as the detection range of a particular sensor, such that if the sensor can detect the presence of the user, the user is deemed to be within the first distance of the computing device (302). As such, determining (404) whether the user (306) is within a first distance of the computing device (302) may be carried out through the use of one or more sensors that are included in or communicatively attached to the computing device (302). Such sensors can include, for example, biometric sensors designed to detect a pulse for the user (306), temperature sensors designed to detect body heat from a proximate user, and so on. For example, if a pulse detecting sensor detects a pulse for the user (306), the user (306) is determined to be within the first distance of the computing device (302). Likewise, if a temperature sensor detects a temperature of the user (306) that is above a predetermined threshold, the user (306) is determined to be within the first distance of the computing device (302).

Figure 5:
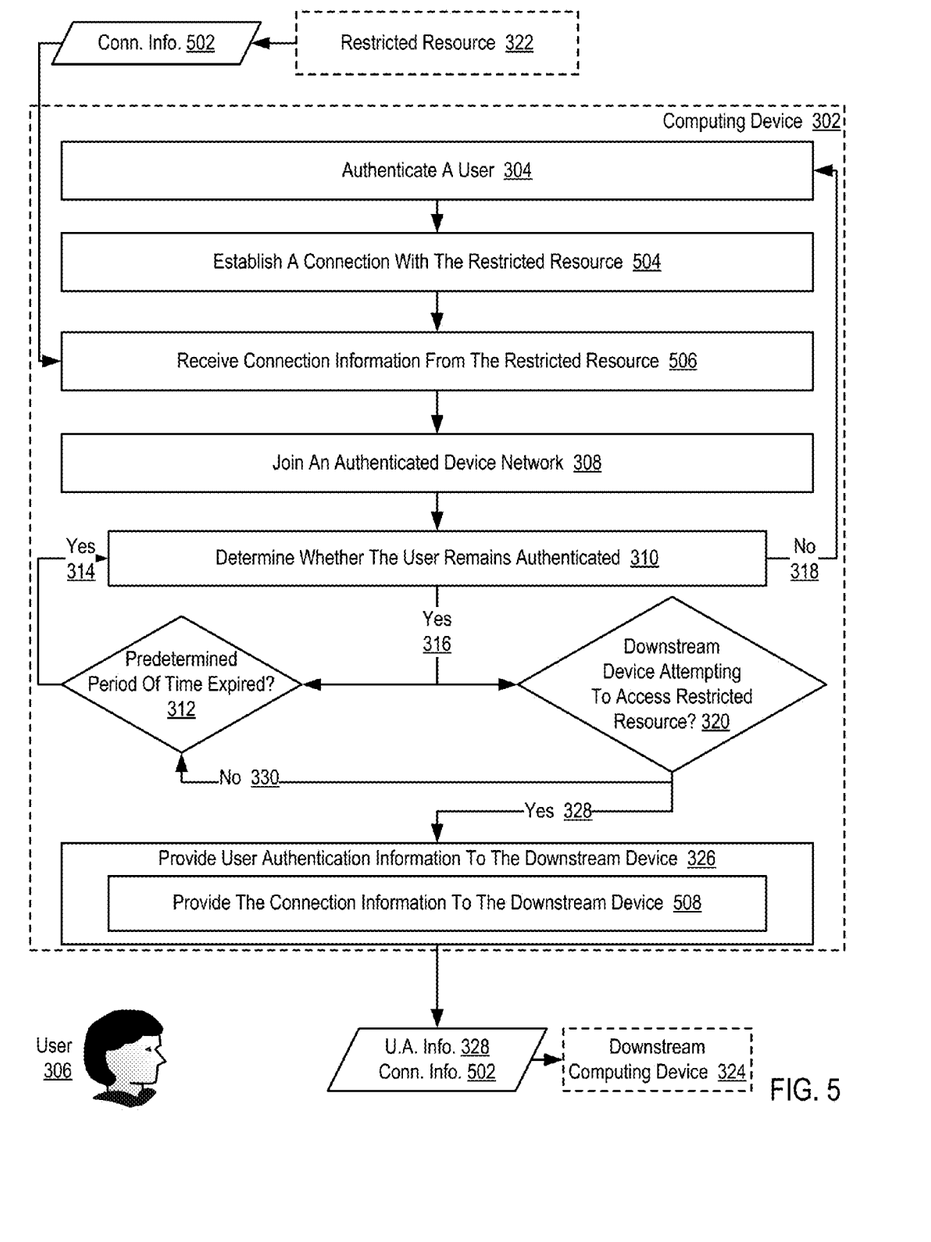
FIG. 5 sets forth a flow chart illustrating an additional example method for providing access to a restricted resource via a persistent authenticated device network according to embodiments of the present invention.

For further explanation, FIG. 5 sets forth a flow chart illustrating a further example method for providing access to a restricted resource via a persistent authenticated device network according to embodiments of the present invention. The example method depicted in FIG. 5 is similar to the example method depicted in FIG. 3, as the example method depicted in FIG. 5 also includes a computing device (302) carrying out the steps of authenticating (304) a user (306) of the computing device (302), joining (308) a persistent authenticated device network, determining (310) whether the user (306) remains authenticated, determining (320) whether a downstream computing device (324) in the persistent authenticated device network is attempting to access a restricted resource (322), and providing (326) user authentication information (328) to the downstream computing device (324).

The example method depicted in FIG. 5 also includes establishing (504) a connection with the restricted resource (322). In the example method depicted in FIG. 5, establishing (504) a connection with the restricted resource (322) may be carried out, for example, by the computing device (302) passing user authentication information (328) such as a username and password to the restricted resource (322) over a data communications connection. Alternatively, establishing (504) a connection with the restricted resource (322) may be carried out by the computing device (302) passing information indicating that the computing device (302) has authenticated the user to the restricted resource (322) over a data communications connection, such that it is the computing device (302) and not the restricted resource (322) that makes the determination as to whether the user (306) should be granted access to the restricted resource (322). Once a connection has been established between the computing device (302) and the restricted resource (322), the computing device (302) is free to access and make use of the restricted resource (322).

The example method depicted in FIG. 5 also includes receiving (506) connection information (502) from the restricted resource (322). In the example method depicted in FIG. 5, such connection information (502) can include information describing the connection between the computing device (302) and the restricted resource (322). Such connection information (322) can include, for example, a session identifier, a connection token that is used to access the restricted resource (322), a port number that is used to access the restricted resource (322), and so on.

In the example method depicted in FIG. 5, providing (326) user authentication information (328) to the downstream computing device (324) can also include providing (508) the connection information (502) to the downstream device (324). By virtue of possessing the connection information (502), the downstream device (324) may access the restricted resource (322) by simply utilizing the connection that has already been established by the computing device (302), rather than establishing a new connection by providing user authentication information (328) to the restricted resource (322).

Figure 6:
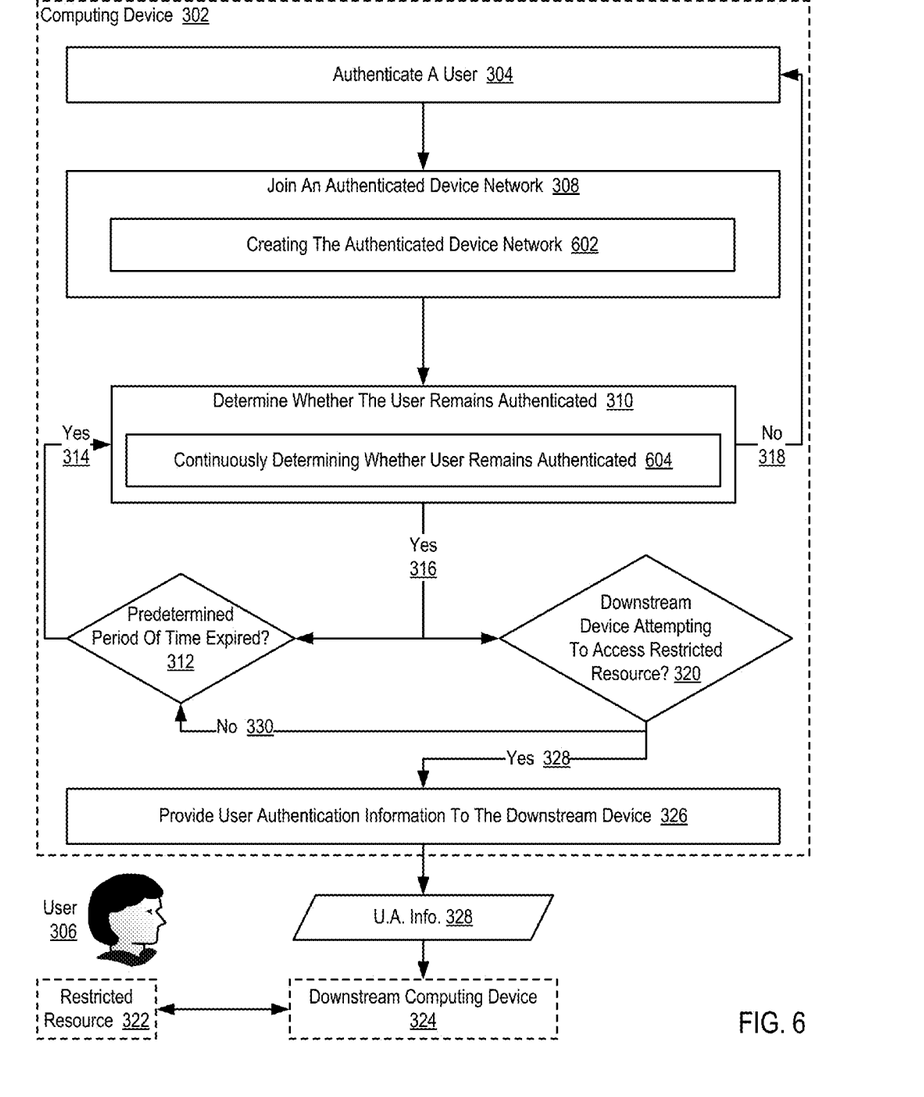
FIG. 6 sets forth a flow chart illustrating an additional example method for providing access to a restricted resource via a persistent authenticated device network according to embodiments of the present invention.

For further explanation, FIG. 6 sets forth a flow chart illustrating a further example method for providing access to a restricted resource via a persistent authenticated device network according to embodiments of the present invention. The example method depicted in FIG. 6 is similar to the example method depicted in FIG. 3, as the example method depicted in FIG. 6 also includes a computing device (302) carrying out the steps of authenticating (304) a user (306) of the computing device (302), joining (308) a persistent authenticated device network, determining (310) whether the user (306) remains authenticated, determining (320) whether a downstream computing device (324) in the persistent authenticated device network is attempting to access a restricted resource (322), and providing (326) user authentication information (328) to the downstream computing device (324).

In the example method depicted in FIG. 6, joining (308) a persistent authenticated device network can include creating (602) the persistent authenticated device network. In the example method depicted in FIG. 6, creating (602) the persistent authenticated device network may be carried out by the computing device (302) entering into a predetermined mode where requests for user authentication information (328) from other computing devices (324) can be serviced by the computing device (302) so long as the computing device (302) and the other computing devices (324) are within a first distance of each other. Alternatively, creating (602) the persistent authenticated device network may be carried out by the computing device (302) sending a message to a centralized network hub indicating that the computing device (302) has entered into a predetermined mode where requests for user authentication information (328) from other computing devices (324) can be serviced by the computing device (302) so long as the computing device (302) and the other computing devices (324) are within a first distance of each other.

In the example method depicted FIG. 6 determining (310) whether the user (306) remains authenticated iteratively, upon the expiration of a predetermined period of time, can include continuously (604) determining whether user (306) remains authenticated. Continuously (604) determining whether user (306) remains authenticated may be carried out, for example, by leaving a biometric sensor such as a pulse monitor constantly powered up, by executing an authentication process in a looped fashion such that upon completing the authentication process, the authentication process begins again, and so on.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by first program instructions on a first computing device,
      authenticating a user;
      joining a persistent authenticated device network;
      iteratively, upon the expiration of a predetermined period of time, determining that the authenticated user remains authenticated, wherein determining that the authenticated user remains authenticated further comprises determining that the authenticated user is within a first distance of the first computing device using a biometric sensor to confirm a presence of the authenticated user;
      responsive to determining that the authenticated user remains authenticated, determining that a downstream computing device in the persistent authenticated device network is attempting to access a restricted resource; and
      responsive to determining that the downstream computing device in the persistent authenticated device network is attempting to access a restricted resource, providing user authentication information to the downstream computing device.

2. The method of claim 1 further comprising:
by the first program instructions on the first computing device, responsive to determining that the authenticated user does not remain authenticated, leaving the persistent authenticated device network so that the first computing device is no longer part of the persistent authenticated device network.

3. The method of claim 1 further comprising:
by the first program instructions on the first computing device,
establishing a connection with the restricted resource;
receiving connection information from the restricted resource; and
wherein providing user authentication information to the downstream computing device further comprises providing the connection information to the downstream device.

4. The method of claim 1 wherein iteratively, upon the expiration of a predetermined period of time, determining that the authenticated user remains authenticated further comprises continuously determining that the authenticated user remains authenticated.

5. The method of claim 1 further comprising creating the persistent authenticated device network.

6. An apparatus comprising a computer processor, a computer memory operatively coupled to the computer processor, the computer memory having disposed within it computer program instructions that, when executed by the computer processor, cause the apparatus to carry out the steps of:
authenticating a user;
joining a persistent authenticated device network;
iteratively, upon the expiration of a predetermined period of time, determining that the authenticated user remains authenticated, wherein determining that the authenticated user remains authenticated further comprises determining that the authenticated user is within a first distance of the first computing device using a biometric sensor to confirm a presence of the authenticated user;
responsive to determining that the authenticated user remains authenticated, determining that a downstream computing device in the persistent authenticated device network is attempting to access a restricted resource; and
responsive to determining that the downstream computing device in the persistent authenticated device network is attempting to access a restricted resource, providing user authentication information to the downstream computing device.

7. The apparatus of claim 6 further comprising computer program instructions that, when executed by the computer processor, cause the apparatus to carry out the step of, responsive to determining that the authenticated user does not remain authenticated, leaving the persistent authenticated device network so that the first computing device is no longer part of the persistent authenticated device network.

8. The apparatus of claim 7 further comprising computer program instructions that, when executed by the computer processor, cause the apparatus to carry out the steps of:
establishing a connection with the restricted resource;
receiving connection information from the restricted resource; and
wherein providing user authentication information to the downstream computing device further comprises providing the connection information to the downstream device.

9. The apparatus of claim 7 wherein iteratively, upon the expiration of a predetermined period of time, determining that the authenticated user remains authenticated further comprises continuously determining whether the authenticated user remains authenticated.

10. The apparatus of claim 7 further comprising computer program instructions that, when executed by the computer processor, cause the apparatus to carry out the step of creating the persistent authenticated device network.

11. A computer program product disposed upon a computer readable medium, the computer readable medium is not a signal, the computer program product comprising computer program instructions that, when executed, cause a first computing device to carry out the steps of:
authenticating a user;
joining a persistent authenticated device network;
iteratively, upon the expiration of a predetermined period of time, determining that the authenticated user remains authenticated, wherein determining that the authenticated user remains authenticated further comprises determining that the authenticated user is within a first distance of the first computing device using a biometric sensor to confirm a presence of the authenticated user;
responsive to determining that the authenticated user remains authenticated, determining that a downstream computing device in the persistent authenticated device network is attempting to access a restricted resource; and
responsive to determining that the downstream computing device in the persistent authenticated device network is attempting to access a restricted resource, providing user authentication information to the downstream computing device.

12. The computer program product of claim 11 further comprising computer program instructions that, when executed, cause the computer to carry out the step of, responsive to determining that the authenticated user does not remain authenticated, leaving the persistent authenticated device network so that the first computing device is no longer part of the persistent authenticated device network.

13. The computer program product of claim 11 further comprising computer program instructions that, when executed, cause the computer to carry out the steps of:
by the first program instructions on the first computing device, establishing a connection with the restricted resource;
receiving connection information from the restricted resource; and
wherein providing user authentication information to the downstream computing device further comprises providing the connection information to the downstream device.

14. The computer program product of claim 11 wherein iteratively, upon the expiration of a predetermined period of time, determining that the authenticated user remains authenticated further comprises continuously determining whether the authenticated user remains authenticated.

15. The computer program product of claim 11 further comprising computer program instructions that, when executed, cause the computer to carry out the step of creating the persistent authenticated device network.

16. The method of claim 1 wherein determining whether the authenticated user remains authenticated further comprises confirming the presence of the authenticated user by checking for the presence of the authenticated user's pulse.

17. The method of claim 1 wherein determining whether the authenticated user remains authenticated further comprises confirming the presence of the authenticated user by checking for the presence of the authenticated user's body heat.

* * * * *